March 2, 1965 J. F. INGLE 3,172,050

BALANCED CLIPPING AMPLIFIER

Filed Dec. 29, 1961 2 Sheets-Sheet 1

INVENTOR
J. F. INGLE
BY
John K. Mullarney
ATTORNEY

March 2, 1965 J. F. INGLE 3,172,050

BALANCED CLIPPING AMPLIFIER

Filed Dec. 29, 1961 2 Sheets-Sheet 2

INVENTOR
J. F. INGLE
BY John K. Mullarney
ATTORNEY 3,172,050

BALANCED CLIPPING AMPLIFIER

James F. Ingle, Summit, N.J., assignor to Bell Telephone Laboratories, Incorporated, New York, N.Y., a corporation of New York Filed Dec. 29, 1961, Ser. No. 163,219
4 Claims. (Cl. 330—14)

Figure 1:
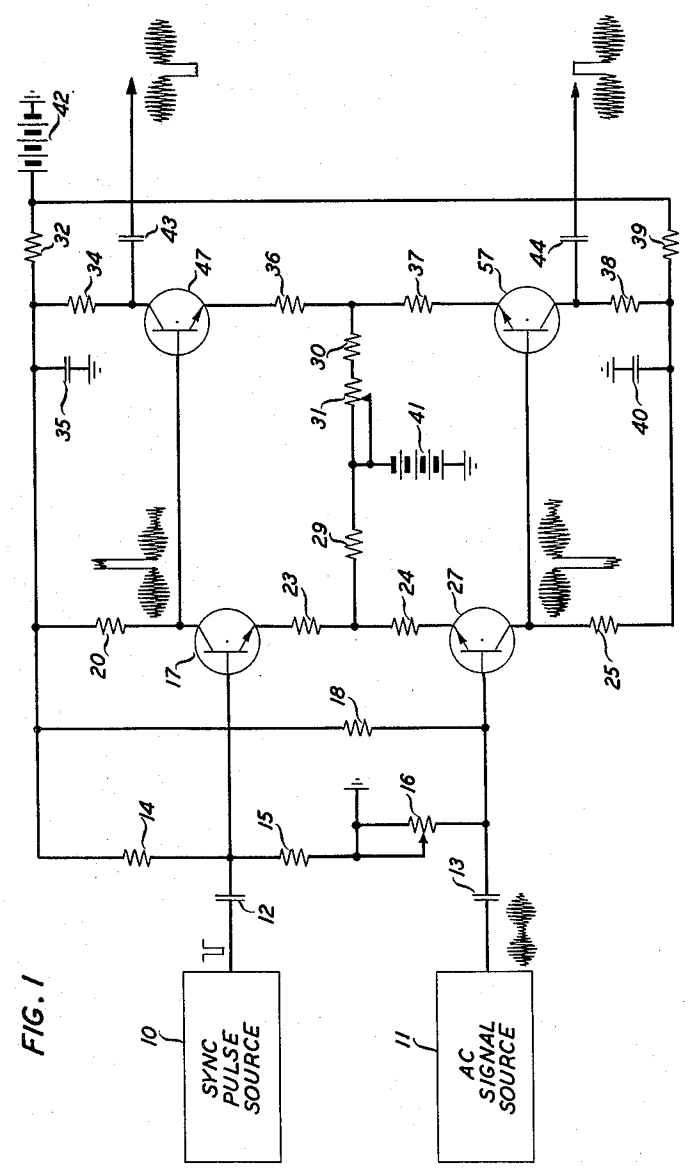

This invention relates to "balanced clipping" amplifiers, and more particularly to such an amplifier arrangement wherein signal excursions which exceed a prescribed level are "clipped" or suppressed.

The term "balanced" to be used hereinafter has reference to that operation wherein the signals at a pair of output terminals are maintained at essentially the same magnitude but 180 degrees out of phase.

There are numerous instances in which it is desirable to clip a portion of an electric wave. In television, for example, the blanking pulses that are inserted in and mixed with the video signals are usually clipped or suppressed in some fashion. This clipping is generally for the purpose of eliminating the video and/or other noise signals that appear superimposed on the blanking pulses; see the patent to V. J. Duke, 2,353,018, issued July 4, 1944. Also, in systems where the television signal is transmitted together with other signals over a common transmission medium, clipping is sometimes desirable to prevent cross-talk, which can result from the blanking pulses overloading the repeaters.

There are other instances where it is necessary to insert synchronization pulses into an electric wave; and here again, to prevent overloading, false synchronization et cetera, it is generally desirable that the sync pulses be clipped at some prescribed level.

Numerous schemes of varying degrees of complexity have been proposed heretofore for carrying out the aforementioned clipping. A typical scheme makes use of one or more diode limiters coupled to the output line. It has been found, however, that the level at which clipping occurs often varies with changes in ambient temperature, i.e., diode parameters are generally quite temperature sensitive. Furthermore, the impedance seen by the output transmission line changes with change in diode conductivity and this introduces mismatch and, consequently, distortion.

Another common scheme relies on blanking the electric wave for a very short period and introducing a controlled amplitude sync pulse therein. The pulse signal can be more readily handled in this manner, but the blanking of the electric wave often results in amplitude and phase distortion therein.

An object of the present invention, therefore, is to clip or suppress a portion of the amplitude variation of an electric wave without otherwise affecting the remainder of the wave.

A further object of the invention is to provide a balanced amplifier arrangement wherein pulse type signals can be readily combined with an electric wave, and the pulse amplitude at the output may be selectively clipped or suppressed without affecting the A.-C. gain of the amplifier except during the pulse interval.

Further objects of the invention are to provide a balanced amplifier wherein synchronization pulses can be readily combined with an electric wave; the output sync pulse amplitude can be varied without affecting the remainder of the wave; the sync pulse amplitudes at the balanced output terminals are substantially equal; and the balanced output impedance of the amplifier is a constant value.

In accordance with the present invention, a pair of transistors of like conductivity have their emitters interconnected to form a balanced amplifier which converts unbalanced inputs to the amplifier into balanced signals at the collectors of said transistors. A first input signal, such as a negative-going sync pulse, is coupled to the base of one of the transistors and another, different signal (e.g., a video signal) is coupled to the base of the other transistor. The applied signals are cross-coupled via the common emitter interconnection so that the video signal, for example, appears with a large positive sync pulse at the collector of one transistor and with a large negative sync pulse at the collector of the other transistor. The video signals at the collectors are of the same magnitude, but 180 degrees out of phase.

The collectors of the recited transistors are respectively connected to the base electrodes of a second pair of transistors which are likewise of similar conductivity and similarly have their emitters interconnected. The aforementioned large negative sync pulse will cause the transistor to which the same is applied to go into current cutoff at a sync pulse voltage level determined by the applied transistor bias, which is in turn fixed by the setting of a variable resistance hereinafter called the sync pulse clipping control. Thus, during this sync pulse interval the voltage gain of this latter transistor is zero. The said latter transistor is connected in the emitter path of the other transistor of said second pair of transistors and hence when it goes into cutoff, as heretofore described, the voltage gain of said other transistor is reduced to practically zero. The voltage gain in this last instance is a function of the ratio of the collector load resistance to the resistance in the emitter path; and since the cutoff transistor represents an exceedingly high impedance, the voltage gain of the said other transistor becomes negligible during the sync pulse interval.

The first pair of transistors operate in a linear manner at all times.

The second pair of transistors operate in a linear manner, except during the sync pulse interval, and the video signal is unaffected by the sync pulse clipping control.

Figure 2:
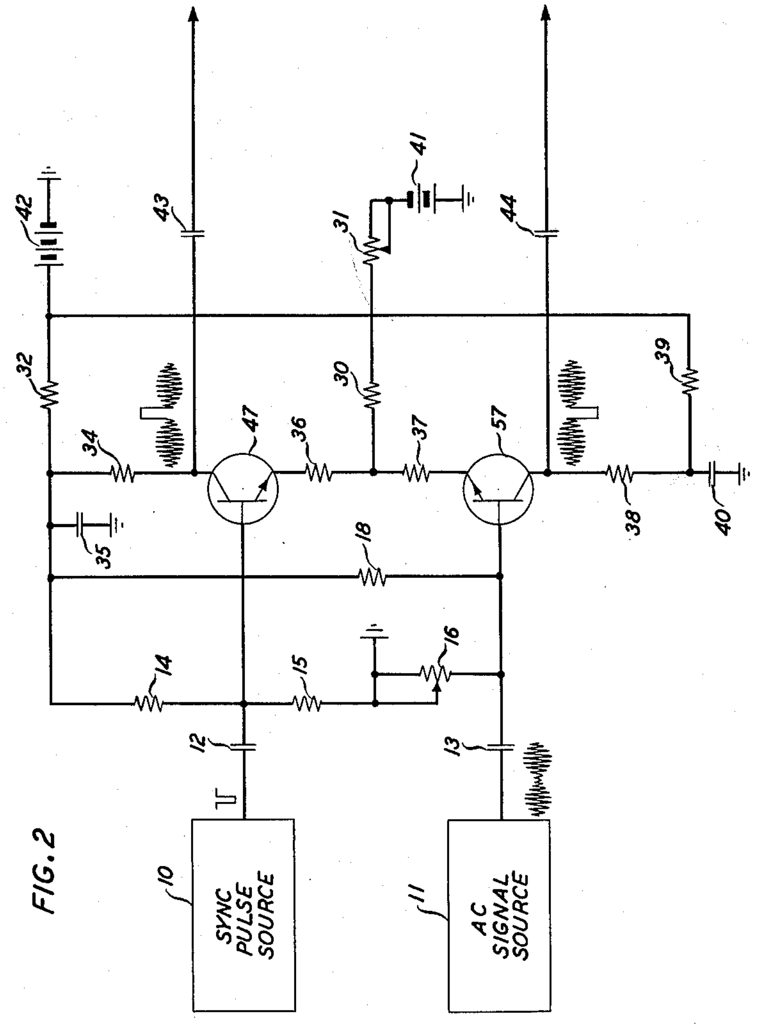

Other objects and advantages of the invention may be better understood from a consideration of the following detailed description when read in accordance with the attached drawing, in which:

FIG. 1 is a schematic circuit diagram showing a balanced clipping amplifier constructed in accordance with the principles of the present invention; and FIG. 2 is a circuit diagram illustrating a modification of the circuit of FIG. 1.

Referring now to FIG. 1 of the drawing, a balanced input amplifier stage, in accordance with the invention, includes a pair of transistors 17 and 27 of similar conductivity. While n-p-n junction type transistors are shown in the drawing, it will be clear to those in the art that transistors of the other conventional types may be used herein. The emitters of transistors 17 and 27 are interconnected via a pair of equal resistances 23 and 24, the latter being unbypassed so as to provide some local degeneration for purposes of stability. The collector of transistor 17 is connected to the direct current biasing source 42 via the collector load resistance 20 and resistance 32. The resistance 32 and capacitance 35 comprise conventional power supply decoupling means. Forward direct current bias for the transistor 17 is developed across the voltage divider composed of resistances 14 and 15.

The collector of transistor 27 is likewise connected to the direct current biasing source 42 via the collector load resistance 25 and resistance 39. Load resistance 20 is equal to load resistance 25. Resistance 39 and capacitance 40 provide power supply decoupling. Forward bias for transistor 27 is developed across the voltage divider composed of resistance 18 and variable resistance 16. This variable resistance permits direct current balancing of the amplifier. Some additional forward bias for these transistors is provided by the connection of the junction of resistances 23 and 24 to the direct current biasing source 41, via the resistance 29.

The balanced amplifier circuit comprising transistors 17 and 27 is used, in accordance with the invention, to convert unbalanced inputs to the amplifier into balanced signals at the collectors of said transistors. To this end, a first input signal, such as a negative-going synchronization pulse, is coupled to the base of transistor 17 via capacitance 12; and another, different input signal (e.g., an alternating current electric wave such as a television video signal) is coupled to the base of transistor 27 via capacitance 13. In general, synchronization and blanking pulses are inserted into an electric wave at prescribed points and this is usually carried out under the control of a timing means (not shown).

The assumed negative-going sync pulse from pulse source 10 is applied to the base of transistor 17 which is connected in conventional common emitter configuration. As is known to those in the art, a 180 degree phase reversal of the input signal is achieved in a common emitter connection and thus an amplified positive-going pulse appears at the collector of transistor 17.

The resistance 29 is of a sufficiently large value as to reduce to a negligible amount the signal current flow therein, and hence the current signal in the emitter path of n-p-n transistor 17 is applied to the emitter of n-p-n transistor 27. With respect to this signal applied to the emitter of transistor 27 as a result of the input sync pulse, the transistor 27 appears connected in the conventional common base configuration. Accordingly, since the signal in the emitter path of transistor 17 suffers no phase reversal and since there is no phase reversal associated with a common base connection, an amplified negative-going pulse appears at the collector of transistor 27.

If the amplifier is direct current balanced, by means of variable resistance 16, the applied sync pulse results in a pair of substantially equal amplitude, yet out-of-phase, pulses at the collector electrodes of transistors 17 and 27. Transistors 17 and 27 operate in a linear manner at all times, resulting in constant input impedances.

In a manner similar to that described above, the applied video signal from source 11 likewise results in balanced out-of-phase signals at said collectors. The composite signals appearing at these collectors are illustrated symbolically in the drawing. And as illustrated by these symbolic representations, the video and/or other noise signals will appear superimposed on the sync pulses. No clipping occurs in this amplifier stage.

The collector electrodes of transistors 17 and 27 are respectively connected to the base electrodes of n-p-n transistors 47 and 57. The emitters of transistors 47 and 57 are interconnected via a pair of relatively low value (e.g., 20 ohms) resistances 36 and 37, these being unbypassed so as to provide small local degeneration for purposes of stability. The junction of these resistances is connected to the direct current biasing source 41 via the resistance 30 and the variable resistance 31 or sync pulse clipping control.

The collector of transistor 47 is connected to the direct current biasing source 42 via the collector load resistance 34 and the decoupling resistance 32. Similarly, the collector of transistor 57 is connected to the biasing source 42 via the collector load resistance 38 and decoupling resistance 39. Load resistance 34 is equal to load resistance 38. The transistors 47 and 57 are biased to operate normally in a linear class A fashion. Thus, except for the sync pulse interval, the input composite signals are linearly amplified in this stage and result in equal amplitude out-of-phase composite (i.e., balanced) signals at the collectors of transistors 47 and 57. The capacitances 43 and 44 couple this balanced output of the amplifier to a balanced transmission line.

For normal linear operation, the impedance to ground at the emitter of transistor 47 essentially comprises resistance 36, resistance 37 and $$\frac{\text{resistance 25}}{\beta}$$

where the beta ($\beta$) of the n-p-n transistors utilized herein is equal to thirty or more. The emitter of transistor 57 is, of course, at substantially the same impedance to ground. If the signals delivered to the bases of transistors 47 and 57 are exactly balanced, the out-of-phase alternating current signals in the emitter paths of said transistors cancel out at the junction point of resistances 30, 36 and 37. Accordingly, said junction point is effectively at A.-C. ground.

The large negative-going sync pulse at the collector of transistor 27 will cause the transistor 57 to go into current cutoff at a sync pulse voltage level determined by the direct current bias applied to this transistor, which is in turn fixed by the setting of potentiometer 31. During this sync pulse interval when transistor 57 is cut off, its current gain is zero, causing it to have zero A.-C. voltage gain. The sync pulse, therefore, is clipped rather sharply at a level determined by the potentiometer setting.

At cutoff, the impedance seen looking into the emitter of transistor 57 is measured in megohms. The resistances 30 and 31 represent a high impedance path, and hence when transistor 57 goes into cutoff the resistance in the emitter path of transistor 47 increases very significantly.

As is known to those in the art, the voltage gain of a common emitter circuit is a function of the ratio of the collector resistance to the resistance in the emitter path. Thus, if the emitter path resistance greatly exceeds the collector resistance the voltage gain of the circuit is reduced to a very low level. In one typical circuit arrangement constructed in accordance with the present invention, a collector load resistance of 31 ohms was used, and the combined resistance of resistance 30 and that portion of resistance 31 series connected therewith to battery 41 totaled approximately 3000 ohms (the shunt megohm impedance of cutoff transistor 57 can be ignored for present purposes). Thus, this circuit exhibited a voltage gain of .01 during the sync pulse interval. With the gain of this transistor circuit so drastically reduced (to a value approaching zero) during the sync pulse interval, the sync pulse is effectively clipped or suppressed. An even greater degree of suppression or reduction in voltage gain can, of course, be achieved by further increasing the value of resistance 30 for example. However, a balanced output satisfactory for most purposes can be achieved if the voltage gain of the transistor 47 stage is reduced during the sync pulse interval to a value of .05 or less. For such a gain the emitter path resistance (e.g., the combined resistance of resistance 30 and that portion of resistance 31 series connected therewith) should be at least twenty times as great as the collector path resistance.

The sync pulse amplitudes at the output collectors are substantially equal, and the same may, of course, be readily varied by means of potentiometer 31. As indicated above, the transistors operate in a linear manner, except during the sync pulse interval, and hence the video signal is unaffected by the sync pulse clipping control so long as the control is not set at a level such that the sync pulse in the output composite signal is less than the peak video signal. For television, this is, of course, the only permissible type of signal.

The output impedance of the amplifier remains constant and, for balanced operation, the same comprises the sum of resistances 34 and 38. The circuit is primarily intended for a balanced output mode of operation; however, if an unbalanced output is desired the same can be taken from the collector of transistor 47 for example.

The input signals from the sources 10 and 11 may be applied directly to the base electrodes of transistors 47 and 57. This alternative arrangement is illustrated in FIG. 2 of the drawing, wherein like reference numerals designate corresponding circuit elements. This circuit operates in substantially the same manner as the four transistor version of FIG. 1, heretofore described. The input signals are cross-coupled via the common emitter interconnection so that substantially balanced composite signals appear at the collectors of transistors 47 and 57.

The input negative sync pulse will cause the transistor 47 to go into current cutoff, at a sync pulse level determined by the sync pulse clipping control 31. And when transistor 47 goes into cutoff the voltage gain of the other transistor 57 is reduced to practically zero, for the same reasons heretofore given. The gain of this latter circuit is, of course, less than that of the four transistor version of FIG. 1; and an exactly balanced output is not as readily obtained. In all other respects, this latter version of the present invention is the full equivalent of the four transistor circuit of FIG. 1.

Signal excursions other than sync pulses can of course be clipped in accordance with the principles of the invention. And while the circuit has been described in terms of converting a pair of unbalanced input signals to a pair of balanced composite output signals, the circuit is equally capable of converting a single unbalanced input signal to a pair of balanced output signals. Accordingly, it is to be understood that the foregoing disclosure relates only to a preferred embodiment of the invention and that numerous modifications or alterations may be made therein without departing from the spirit and scope of the invention.

What is claimed is:

1. A balanced clipping amplifier for providing a pair of equal amplitude out-of-phase output signals comprising a pair of transistors of similar conductivity type each having an emitter, a collector and a base electrode, a load resistance connected in each collector path, means for connecting the emitter electrodes to each other through a low resistance path and through a common high resistance path to a point of reference potential, said high resistance path having a resistance of the order of twenty or more times that of each load resistance, means for coupling at least a first signal source to the base electrode of one of said transistors, and means for controlling the point at which a predetermined one of said transistors goes into current cutoff in response to the applied signal from said first signal source.

2. A balanced clipping amplifier for providing a pair of equal amplitude out-of-phase output signals comprising a pair of transistors of similar conductivity type each having an emitter, a collector and a base electrode, a load resistance respectively connected in each collector path, means for connecting the emitter electrodes to each other through a low resistance path and through a common high resistance path to a point of reference potential, means for coupling at least a first signal source to the base electrode of one of said transistors, and means for controlling the point at which a predetermined one of said transistors goes into current cutoff in response to the applied signal from said first signal source, the ratio of the resistance in the aforementioned common path to said collector load resistance being of a sufficiently high value such as to reduce to a negligible amount the gain of the other transistor when said predetermined transistor goes into current cutoff.

3. A signal translating circuit for providing a pair of equal amplitude out-of-phase composite output signals from a pair of unbalanced input signals comprising a first pair of transistors of similar conductivity type each having an emitter, a collector and a base electrode, means for coupling an alternating current electric wave to the base of one of said transistors, means for coupling periodic pulses to be intermixed with said electric wave to the base of the other of said transistors, means for interconnecting the emitter electrodes to each other through a low impedance path and to a direct current source through a common path, a second pair of transistors of similar conductivity each having an emitter, a collector and a base electrode, means for coupling the collector electrodes of said first pair of transistors to respective base electrodes of said second pair of transistors, a load resistance respectively connected in each collector path, means for connecting the emitter electrodes of said second pair of transistors to each other through a low resistance path and through a common high resistance path to a point of reference potential, said high resistance path having a resistance at least twenty times that of each load resistance, and means for controlling the point at which a predetermined one of said second pair of transistors goes into current cutoff in response to the composite signal applied to the base thereof.

4. In combination, a pair of transistors of similar conductivity type each having an emitter, a collector and a base electrode, a pair of equivalent load resistances respectively connected in each collector path, means for connecting the emitter electrodes to each other through a low resistance path, means connecting the point of equipotential between said emitter electrodes to a direct current source through a high resistance, said high resistance having a resistance of the order of twenty or more times that of each collector load resistance, said direct current source serving to forward bias the emitter-base junctions of said transistors, means for correspondingly varying said forward bias, means for biasing said transistors for balanced linear operation, means coupling an alternating current electric wave to the base of one of said transistors, means coupling high amplitude periodic pulses to the base of the other of said transistors, the aforementioned bias varying means serving to control the point at which one of said transistors goes into current cutoff in response to the high amplitude periodic pulses, the gain of the other transistor being reduced to a negligible amount during the period that the said one transistor is cut off.

References Cited in the file of this patent

UNITED STATES PATENTS

| | | |
|---|---|---|
| 2,697,747 | Baker | Dec. 21, 1954 |
| 2,892,081 | Rieke | June 23, 1959 |
| 3,046,487 | Matzen et al. | July 24, 1962 |